(12) United States Patent
Burton et al.

(10) Patent No.: US 7,641,096 B2
(45) Date of Patent: Jan. 5, 2010

(54) FRICTION STIR WELDING APPARATUS

(75) Inventors: Kurt A. Burton, Wildwood, MO (US); Mike P. Matlack, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 425 days.

(21) Appl. No.: 11/041,836

(22) Filed: Jan. 24, 2005

(65) Prior Publication Data

US 2006/0163316 A1 Jul. 27, 2006

(51) Int. Cl.
*B23K 20/12* (2006.01)
(52) U.S. Cl. .................................. 228/2.1; 228/112.1
(58) Field of Classification Search .............. 228/112.1, 228/2.1, 2.3
See application file for complete search history.

(56) References Cited

U.S. PATENT DOCUMENTS

| 5,893,507 | A * | 4/1999 | Ding et al. ................... 228/2.1 |
| 6,264,088 | B1 * | 7/2001 | Larsson ...................... 228/2.1 |
| 6,421,578 | B1 * | 7/2002 | Adams et al. ................ 700/212 |
| 6,554,175 | B1 * | 4/2003 | Thompson ................ 228/112.1 |
| 6,732,900 | B2 | 5/2004 | Hansen et al. |
| 6,742,696 | B2 * | 6/2004 | Thompson .................. 228/103 |
| 6,874,672 | B2 * | 4/2005 | Okamoto et al. .......... 228/112.1 |
| 7,234,625 | B2 * | 6/2007 | Loitz et al. .................... 228/2.1 |
| 2003/0201307 | A1 * | 10/2003 | Waldron et al. .......... 228/112.1 |
| 2003/0209586 | A1 | 11/2003 | Thompson |

* cited by examiner

*Primary Examiner*—Roy King
*Assistant Examiner*—Michael Aboagye
(74) *Attorney, Agent, or Firm*—Harness, Dickey & Pierce, P.L.C.

(57) ABSTRACT

A friction stir welding apparatus has a novel tool-in-tool construction where a friction stir welding pin tool extends through a center bore of a friction stir welding shoulder tool and is moveable axially and rotationally relative to the shoulder tool. The pin tool and shoulder tool both have their own dedicated tool holders and spindles that enable the tools to rotate and move axially relative to each other and enable easy replacement of each of the tools.

6 Claims, 4 Drawing Sheets

# FRICTION STIR WELDING APPARATUS

BACKGROUND

(1) Field of the Disclosure

The present disclosure pertains to a friction stir welding apparatus in which a friction stir welding pin tool is received in a center bore of a friction stir welding shoulder in a tool-in-tool arrangement.

Description of the Related Art

Friction stir welding is a recently developed method of welding that involves joining two sheets of metal along a weld line without fusing the metal of the sheets and without the use of welding filler materials. The welds are created by the combination of frictional heating of the metal by a rotating tool and mechanically deforming the metal with the rotating tool. The tool is typically constructed of a metal that is harder than the metal being friction stir welded. The tool has a cylindrical section with a circular distal end surface. The circular distal end surface of the tool is typically known as the "shoulder surface" of the tool. A smaller cylindrical section projects outwardly from the center of the tool distal end surface. The smaller cylindrical section or probe is typically referred to as the "pin" of the tool. The junction between the pin and the shoulder surface forms the "shoulder" of the tool.

In the friction stir welding process, the stir welding tool is rotated and pressed into a butt joint or lap joint or other similar type of joint, between the two pieces of metal being joined. The two pieces of metal must be rigidly pressed together before the welding operation. The pin penetrates into the metal of the joint and the shoulder surface rubs the top surfaces of the two pieces of metal over the joint. The rotation of the tool shoulder surface and pin generates friction heat in the joint. The friction heat generated causes the metal along the joint to soften without reaching the melting point of the metal. The softening of the metal allows the friction stir welding tool to be moved along the weld line of the joint. The softened metal is transferred from the leading edge of the rotating tool to the trailing edge of the tool, forming a solid phase bond between the two pieces of metal along the weld joint. As the weld is completed, the tool shoulder and pin sections are withdrawn from the two pieces of metal. To avoid leaving a hole in the weld by the withdrawal of the pin from the welding joint, the friction stir welding tool can have a pin that is retracted into the shoulder section of the tool, leaving a flat shoulder surface at the distal end of the tool that leaves behind an integral weld between the two pieces of metal.

The prior art friction stir welding tools are mounted on machines similar to milling machines. Such a machine rotates the tools about their center axes, moves the tools axially toward and away from the materials being welded, and moves the materials laterally when making the weld. In retractable pin stir welding tools, the pin is mounted inside the shoulder and is operatively connected with the shoulder by an actuator that selectively extends the pin a set distance from the shoulder end surface during the welding operation, and retracts the pin into the shoulder end surface at the completion of the welding operation. The pin tool actuator is typically contained inside the shoulder tool and the shoulder and pin assembly is rotated together by a spindle. The shoulder and pin assembly is removably connected to the spindle and moves with the spindle relative to the pieces of material being welded during the welding operation.

Due to the existing designs of friction stir welding machine spindles and the present techniques of installing retractable pin and shoulder friction stir welding tools on the spindles, maintaining a tight tolerance between the pin and shoulder tools is impractical. The tolerances between prior art pin and shoulder tools are low, and therefore the run-out tolerance or the close fit between the pin and shoulder is generally very poor. This results in inaccurate welds produced by the tools. In addition, the time required to change the pin and shoulder friction stir welding tools in a spindle in the current configuration of friction stir welding machines is very slow and costly.

Summary

The present friction stir welding apparatus provides a novel tool-in-tool holding system that, when combined with an electro-mechanical coaxial spindle design of a stir welding machine, is ideal for the production friction stir welding process. The apparatus comprises a friction stir welding pin tool that is mounted through a center bore of a friction stir welding shoulder tool. The coaxial mounting of the two tools enables both the pin tool and shoulder tool to be engaged and held by two separate standard commercially available tool holders. This facilitates the installation and removal of each of the pin and shoulder tools from the friction stir welding apparatus, and thereby increases the available production time of the apparatus.

The shoulder tool holder is modified to allow the pin tool to extend through both the shoulder tool center bore and the shoulder tool holder. The use of two separate holders for the pin and shoulder tools utilizes the overall accurate positioning of the pin and shoulder spindles of the apparatus. The use of two off-the-shelf tool holders for holding the pin and shoulder tools separately is a unique alternative to the prior art method of holding the prior art friction stir welding pin and shoulder assemblies that allows for tighter welding process tolerances, decreases the run-out of the pin tool and shoulder tool, and allows for shorter, predictable tool changes and more accurate friction stir welds. Pin tool and shoulder tool changes are predictable, man-hours are decreased, tool accuracy and tool relationships are very accurate, welding tolerances are increased and are more predictable. In addition, the wear and tear on expensive spindles is decreased because the run-out of the friction stir welding pin tool and shoulder tool is reduced.

The friction stir welding apparatus of the present disclosure makes use of a conventional machine employed in friction stir welding operations, such as a milling machine. The milling machine is modified with a pair of separate spindle assemblies in lieu of the single spindle assembly of the conventional milling machine. The two spindle assemblies include a dedicated pin tool spindle and a dedicated shoulder tool spindle that are contained in a spindle casing of the machine in axially aligned and spaced positions. The pin tool spindle and the shoulder tool spindle rotate independently of each other and can be controlled to rotate at the same or different rates of rotation, and in the same or different directions of rotation. As in the conventional friction stir welding apparatus, the machine can be controlled to move the two spindles together toward and away from the materials to be welded, and the machine can be controlled to move the materials laterally relative to the machine.

The friction stir welding apparatus also includes a friction stir welding pin tool and pin tool holder, and a friction stir welding shoulder tool and shoulder tool holder.

The friction stir welding pin tool has a generally cylindrical length with opposite proximal and distal ends, and opposite proximal and distal end surfaces. The pin tool has a center axis that is also the center axis of the tool-in-tool apparatus.

The pin tool proximal end is removably attached to the pin tool spindle by the pin tool holder. The opposite distal end and distal end surface of the pin tool function as the projecting pin in the friction stir welding process.

The friction stir welding shoulder tool as a length with opposite proximal and distal ends and opposite proximal and distal end surfaces. A hollow center bore extends entirely through the length of the friction stir welding shoulder tool. The center bore extends through the opposite proximal and distal end surfaces of the shoulder tool. The shoulder tool holder removably attaches the shoulder tool to the shoulder tool spindle. The shoulder tool holder also has a center bore that is aligned with the shoulder tool center bore when the shoulder tool is engaged by the shoulder tool holder.

With the friction stir welding pin tool held to the pin tool spindle by the pin tool holder, and with the friction stir welding shoulder tool held to the shoulder tool spindle by the shoulder tool holder, the pin tool extends axially through the center bore of the shoulder tool holder and through the center bore of the shoulder tool. Rotation of the pin tool spindle and the shoulder tool spindle rotates both the pin tool and shoulder tool in the same or opposite directions, and at the same or different rates of rotation. In addition, relative axial movement between the pin tool spindle and the shoulder tool spindle moves the pin tool axially through the center bore of the shoulder tool. This enables the distal end of the pin tool to be extended outwardly from the distal end of the shoulder tool to produce the relatively positioned pin and shoulder surfaces used in the friction stir welding processes, and enables the retraction of the pin into the shoulder tool surface when the welding process is completed.

The tool-in-tool arrangement of the pin tool and shoulder tool enables the use of separate spindles and separate tool holders for the friction stir welding tools. This also enables reduced tolerances between the tools that produces better friction stir welds, and enables easier replacement of the two tools that reduces man-hours and downtime of the friction stir welding apparatus.

Brief Description of the Drawings

Further features of the disclosure are set forth in the following detailed description an embodiment of the disclosure and in the drawing figures wherein.

Detailed Description of the Preferred Embodiment

Figure 1:
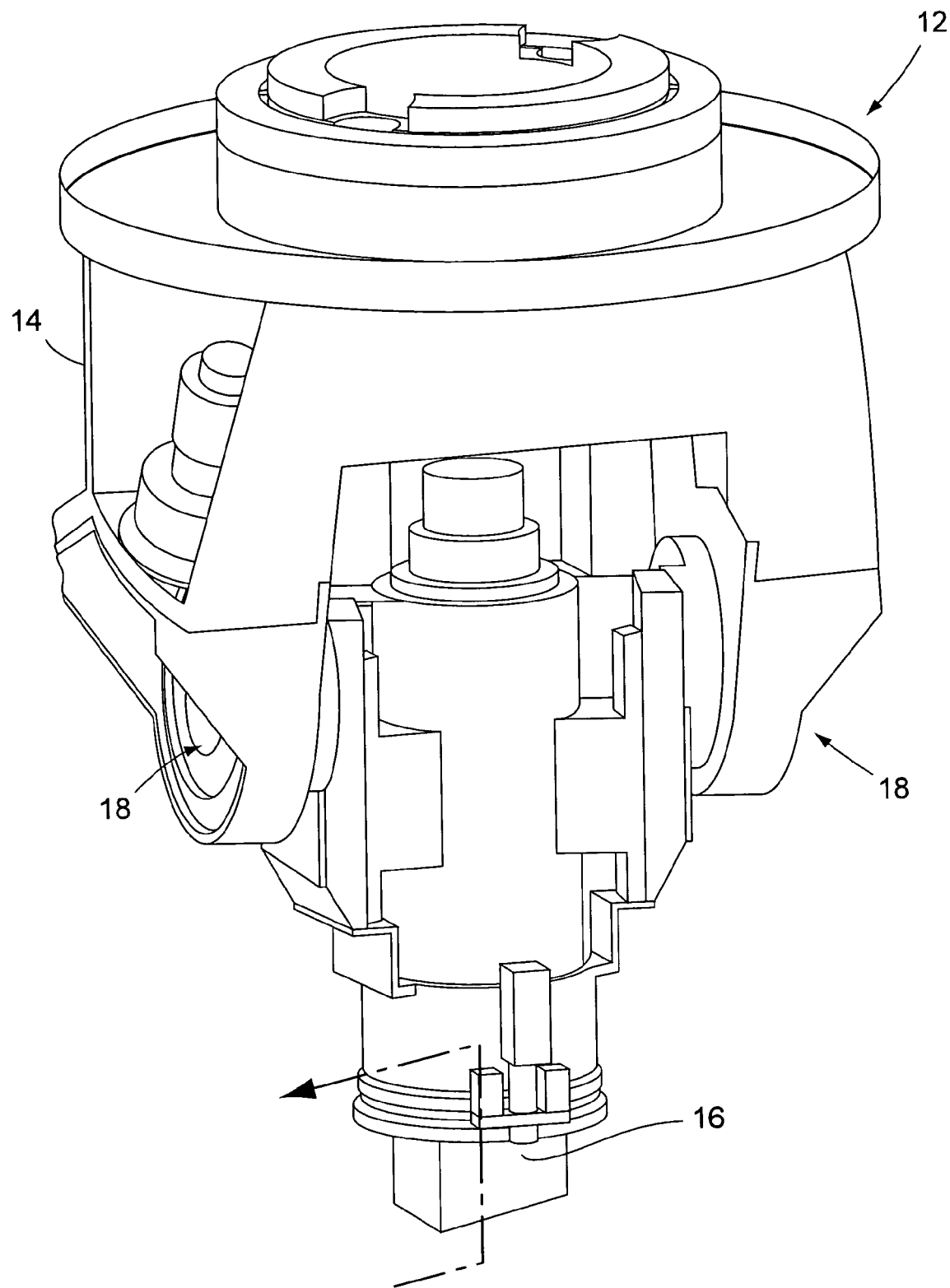
FIG. 1 is a perspective view of a portion of a conventional machine, such as a milling machine, that has been modified to house the tool-in-tool friction stir welding apparatus of the present disclosure.

FIG. 1 shows a portion of a conventional friction stir welding machine 12, for example a milling machine, that has been modified by the tool-in-tool apparatus of the present disclosure to perform friction stir welding operations. Because various types of milling machines exist and their constructions are well known, the component parts of the machine 12 shown in FIG. 1 will not be described in detail. The machine 12 includes a spindle carriage 14 that supports the friction stir welding tool-in-tool apparatus of the disclosure over materials to be welded (not shown). As is conventional, the machine 12 is capable of moving the materials to be welded laterally relative to the spindle carriage 14 in performing the welding operation. The spindle carriage 14 suspends a spindle housing 16 from pivot assemblies 18. The spindle housing 16 contains the friction stir welding tool-in-tool apparatus of the disclosure. The connection of the spindle housing 16 to the carriage 14 by the pivot assemblies 18 enables the entire spindle housing to be pivoted by the machine about a horizontal axis that extends through the pivot assemblies.

Figure 2:
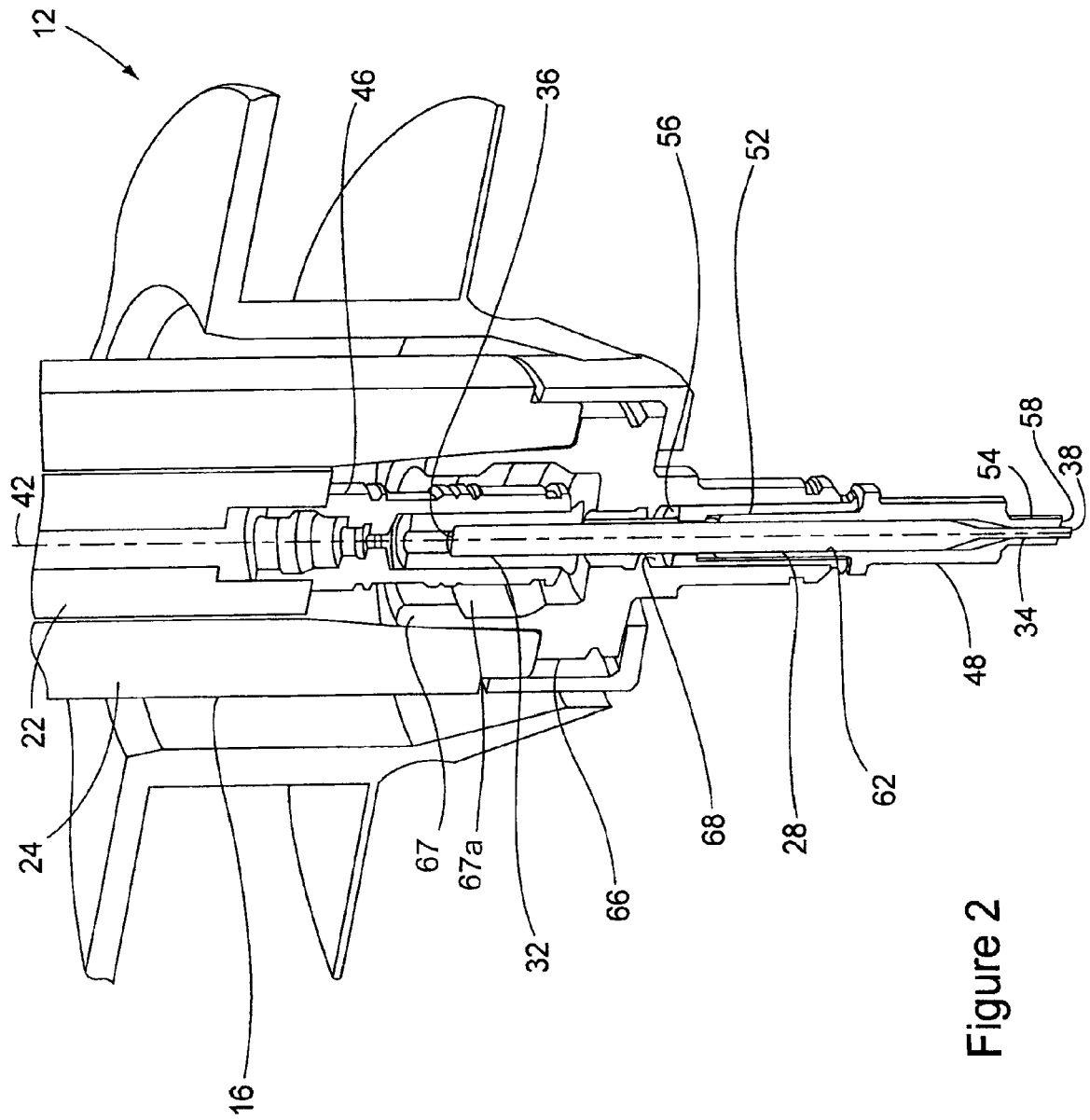
FIG. 2 is a cross section of a portion of the machine shown in FIG. 1 taken along the line 2-2 of FIG. 1.

FIG. 2 shows a cross section view through a lower portion of the spindle housing 16 of FIG. 1. FIG. 2 shows the modifications made to the conventional machine 12 for the apparatus of the present disclosure. The machine 12 has been modified by replacing the single spindle assembly of the conventional machine with a pair of separate spindle assemblies 22, 24. The two spindle assemblies include a dedicated pin tool spindle 22 and a dedicated shoulder tool spindle 24. Both spindle tools 22, 24 are contained in the spindle housing 16 and operate in the same manner as conventional spindles. The two spindles 22, 24 are axially aligned and spaced from each other in the spindle housing 16. Conventional controls are used to control the operation of the pin tool spindle 22 and shoulder tool spindle 24. The pin tool spindle 22 and shoulder tool spindle 24 are controlled to rotate independently of each other, and are controlled to rotate at the same or different rates of rotation. In addition, the two spindles 22, 24 are controlled to rotate in the same or different directions of rotation. As in the conventional stir friction welding apparatus, the machine 12 can be controlled to move the spindle carriage 14 and the two spindles 22, 24 toward and away from the materials to be welded, and laterally relative to the materials to be welded. In addition, the machine 12 and control system are modified to move the two spindles 22, 24 toward and away from each other.

A pin tool 28 of the friction stir welding apparatus of the disclosure is operatively connected to the pin tool spindle 22. The pin tool 28 has a generally cylindrical length with opposite proximal 32 and distal 34 end portions with respective proximal 36 and distal 38 end surfaces. The pin tool 28 has a center axis 42 that is also the center axis of the pin tool spindle 22 and the shoulder tool spindle 24. The pin tool 28 has a generally cylindrical exterior surface 44 along its length. The pin tool circumference tapers down to a reduced diameter at the distal end portion 34 of the tool. The distal end portion 34 at the distal end surface 38 of the pin tool function as the pin of the friction stir welding apparatus of the present disclosure.

A pin tool holder 46 operatively connects the pin tool 28 to the pin tool spindle 22 for rotation of the pin tool with the spindle. The pin tool holder 46 is a conventional holder, for example a standard HSK E-40 tool holder or other equivalent holder that removably attaches the pin tool 28 to the pin tool spindle 22 without the use of separate fasteners. The pin tool holder 46 engages around the exterior surface of the pin tool 28 at the proximal end portion 32 and engages inside the pin tool spindle 22 in attaching the pin tool to the spindle in a conventional manner. With the pin tool 28 removably attached to the pin tool spindle 22, the pin tool rotates with the rotation of the pin tool spindle and moves axially with axial movements of the pin tool spindle.

A shoulder tool 48 of the disclosure receives the pin tool 28. The shoulder tool 48 has a length with opposite proximal 52 and distal 54 end portions at respective proximal 56 and distal 58 end surfaces of the tool. A hollow interior bore 62 extends through the length of the shoulder tool 48 and emerges from the opposite proximal end surface 56 and distal end surface 58 of the tool. The center bore 62 has a center axis that is coaxial with the pin tool center axis 42. The pin tool 28 is mounted in the shoulder tool 48 center bore 62 with the proximal end portion 32 of the pin tool projecting from the shoulder tool 48. This enables attachment of the pin tool holder 46 to the pin tool proximal end portion 32. The pin tool 28 is mounted in the shoulder tool center bore 62 for relative rotational movement of the two tools and for relative axial movement of the two tools. The mounting of the pin tool 28 in the shoulder tool center bore 62 enables a close tolerance between the cylindrical exterior surface of the pin tool 28 and the cylindrical interior surface of the shoulder tool bore 62. The shoulder tool distal end surface 58 functions as the shoulder surface during friction stir welding operations performed by the apparatus, and the juncture between the shoulder tool distal end surface 58 and the distal end portion 34 of the pin tool 28 defines the shoulder of the friction stir welding apparatus.

Figure 3:
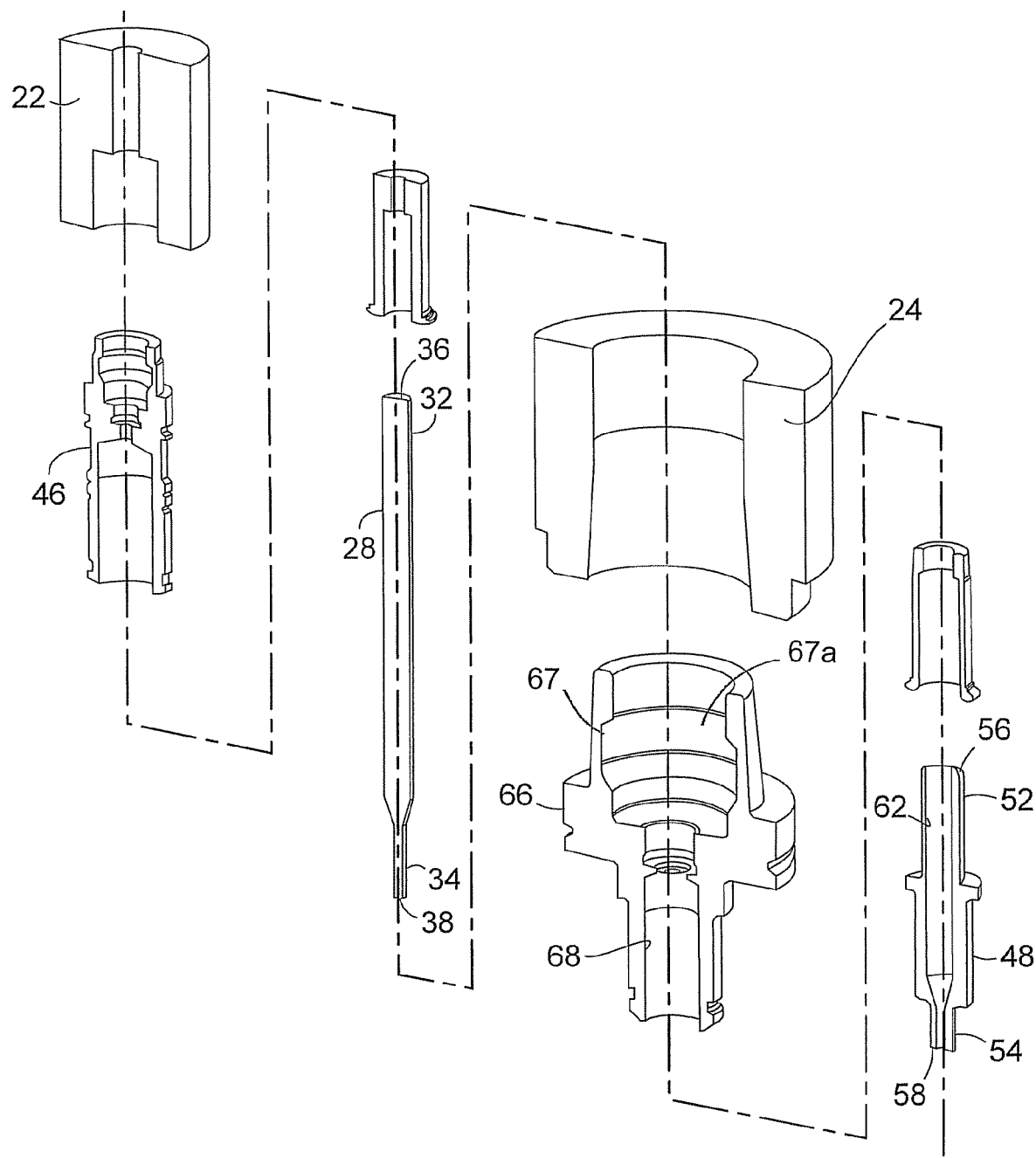
FIG. 3 is an exploded view of the component parts of the tool-in-tool friction stir welding apparatus of the disclosure.
Figure 4:
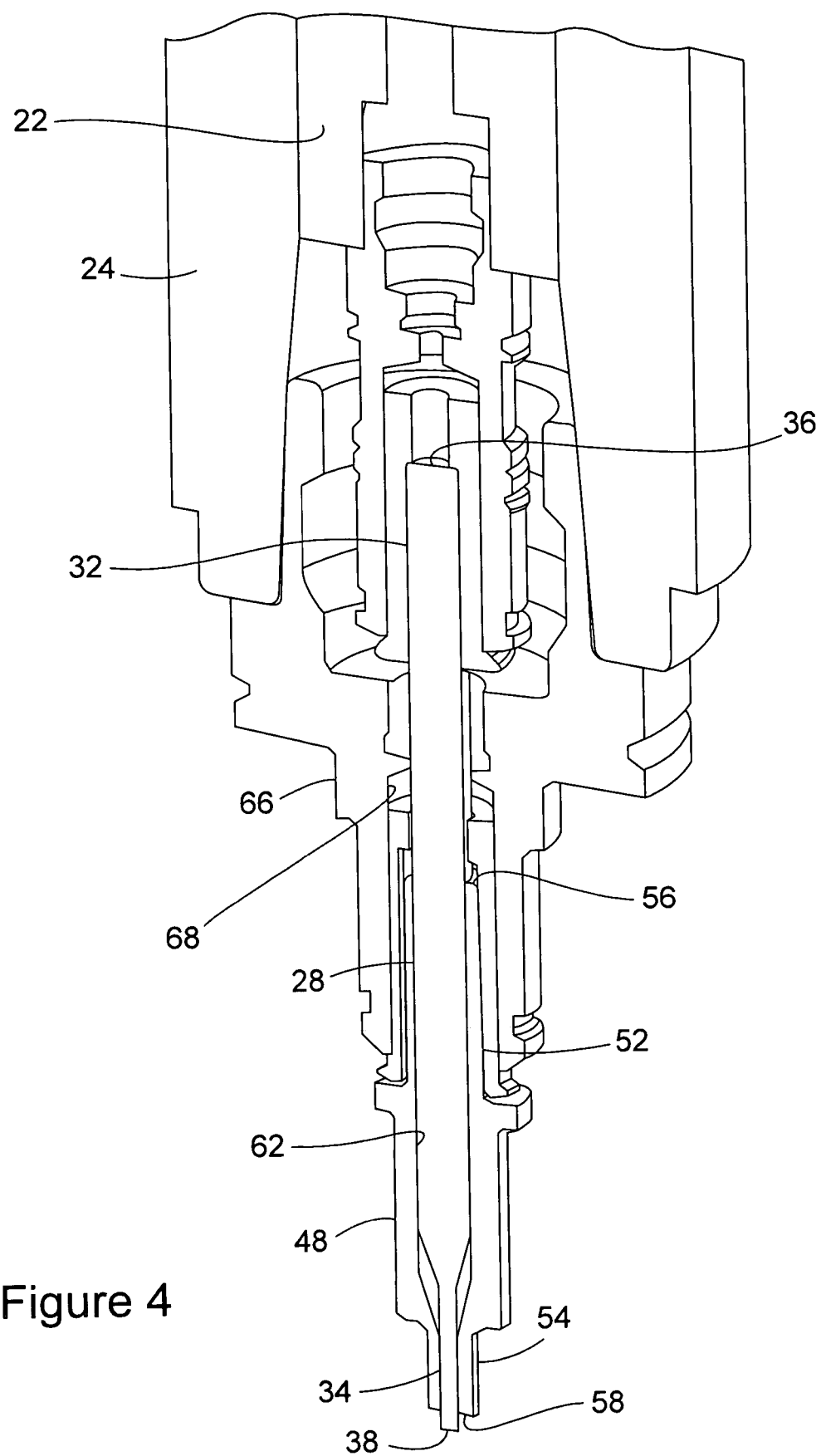
FIG. 4 is a partial cross section of the friction stir welding apparatus of the disclosure.

A shoulder tool holder 66 is a modified conventional tool holder, for example a modified HSK A-100 tool holder. The shoulder tool holder 66 is modified with a center bore 68 sufficiently large in diameter to accept the proximal end 52 of the shoulder tool 48. A center bore 62 of the shoulder tool 48 is dimensioned to allow the pin tool 28 to pass entirely through the shoulder tool 48 and to move freely, with minimal run-out or tolerance within the shoulder tool 48. The modified shoulder tool holder 66 also removably attaches the shoulder tool 48 to the shoulder tool spindle 24 without the use of separate fasteners. The shoulder tool 48 also includes an enlarged end 67 having a cavity 67a. The cavity 67a is sufficiently large in diameter to house at least a portion of the pin tool holder 46 therein, as shown in FIGS. 2 and 3.

With the friction stir welding pin tool 28 held to the pin tool spindle 22 by the pin tool holder 46, and with the friction stir welding shoulder tool 48 held to the shoulder tool spindle 24 by the shoulder tool holder 66, the pin tool 28 extends axially through the center bore 68 of the shoulder tool holder and through the center bore 62 of the shoulder tool 48. The pin tool holder 46 is substantially entirely positioned within the shoulder spindle 24, as shown in FIG. 2. Rotation of the pin tool spindle 22 and the shoulder tool spindle 24 rotates both the pin tool 28 and the shoulder tool 48 in the same or opposite directions, and at the same or different rates of rotation. In addition, relative axial movement between the pin tool spindle 22 and the shoulder tool spindle 24 moves the pin tool 28 axially through the shoulder tool center bore 62. This enables the distal end surface 38 of the pin tool to be extended outwardly from the distal end surface 58 of the shoulder tool to produce the relatively positioned pin and shoulder surfaces used in the friction stir welding process. Movement of the pin tool spindle 22 relative to the shoulder tool spindle 24 also enables the retraction of the pin tool distal end portion 34 into the shoulder tool center bore 62 with the pin tool distal end surface 38 being retracted to the shoulder tool distal end surface 58 when the welding process is completed.

The tool-in-tool arrangement of the pin tool and shoulder tool enables the use of separate spindles and separate tool holders for the friction stir welding tools. This enables reduced tolerances between the tools that produces better friction stir welds, and enables easier replacement of the two tools that reduces man-hours and downtime of the friction stir welding apparatus.

Although the apparatus of the disclosure has been described above by reference to a particular embodiment, it should be understood that variations and modifications could be made to the apparatus without departing from the intended scope of the following claims.

The invention claimed is:

1. A friction stir welding apparatus comprising:

a friction stir welding pin tool having a length with opposite proximal and distal ends and a center axis extending through the pin tool length;

a friction stir welding shoulder tool having a length with opposite proximal and distal ends and a center bore extending through the shoulder tool;

the pin tool being mounted in the shoulder tool bore for independent rotational and linear movement of the pin tool relative to the shoulder tool in the shoulder tool bore;

a pin tool rotation source operatively connected to the pin tool for rotating the pin tool independently of the shoulder tool;

a shoulder tool rotation source operatively connected to the shoulder tool independent of the pin tool rotation source, for rotating the shoulder tool independently of rotation of the pin tool, the shoulder tool rotation source being separate from the pin tool rotation source and the shoulder tool being movable linearly independently of said pin tool and in either a common rotational direction with said pin tool or an opposite rotational directional of a rotation of said pin tool;

a shoulder tool holder for holding the shoulder tool stationary relative to the shoulder tool rotation source, the shoulder tool have an enlarged end portion forming a cavity; and a pin tool holder for holding the pin tool stationary relative to the pin tool rotation source, the pin tool holder being shaped and of dimensions such that a portion of the pin tool holder is housed within the cavity of the shoulder tool holder and concentrically with the shoulder tool holder, and such that the pin tool extends concentrically through the shoulder tool holder and the shoulder tool.

2. The apparatus of claim 1, further comprising:

the pin tool rotation source being operable to rotate the pin tool at a first rate of rotation; and, the shoulder tool rotation source being operable to rotate the shoulder tool at a second rate of rotation that is different from the first rate of rotation.

3. The apparatus of claim 1, further comprising:

the pin tool rotation source being a pin tool spindle on the apparatus that is operatively connected to the pin tool; and, the shoulder tool rotation source being a shoulder tool spindle on the apparatus that is operatively connected to the shoulder tool.

4. A friction stir welding apparatus comprising:

a friction stir welding pin tool having a length with opposite proximal and distal ends and a center axis extending through the pin tool length;

a friction stir welding shoulder tool having a length with opposite proximal and distal ends and a center bore extending through the shoulder tool length;

the pin tool being mounted in the shoulder tool center bore;

a pin holder engaging the pin tool and removably connecting the pin tool to the apparatus;

a shoulder tool holder engaging the shoulder tool and removably connecting the shoulder tool to the apparatus, the shoulder tool holder being separate from the pin tool holder and including an enlarged end portion having a cavity, the pin tool holder being of dimensions such that a portion of the pin tool holder is concentrically housed within the cavity of the shoulder tool;

a pin tool spindle operatively connected to the pin tool holder for rotating the pin tool holder and the engaged pin tool about the pin tool axis;

a shoulder tool spindle operatively connected to the shoulder tool holder for rotating the shoulder tool holder and the engaged shoulder tool, independently of the pin tool and in either a common rotational direction with the pin tool or an opposite rotational direction relative to the pin tool axis; and the pin tool holder further being of dimensions such that it is substantially entirely housed within the shoulder tool spindle.

5. The apparatus of claim 4, further comprising:

the pin tool spindle being movable axially relative to the shoulder tool spindle.

6. The apparatus of claim 4, further comprising:

the pin tool spindle and the shoulder tool spindle being rotatable at different rates of rotation.

* * * * *

UNITED STATES PATENT AND TRADEMARK OFFICE
CERTIFICATE OF CORRECTION

PATENT NO. : 7,641,096 B2 Page 1 of 1
APPLICATION NO. : 11/041836
DATED : January 5, 2010
INVENTOR(S) : Burton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 523 days.

Signed and Sealed this

Sixteenth Day of November, 2010

David J. Kappos
*Director of the United States Patent and Trademark Office*